2,950,957

PREPARATION OF CHLORINE

Wallace Ward, Wilmington, Del., assignor to E. I. du Pont de Nemours and Company, Wilmington, Del., a corporation of Delaware No Drawing. Filed Oct. 15, 1958, Ser. No. 767,254

2 Claims. (Cl. 23—219)

The process of the present invention relates to a method for the preparation of chlorine, and in particular to a method for the preparation of chlorine by a non-electrolytic route.

The object of the present invention is the preparation of chlorine by a non-electrolytic method using inexpensive starting materials and producing valuable side-products.

In accordance with the present invention, chlorine is produced by a process which comprises passing a mixture of gaseous silicon tetrafluoride, free oxygen and vaporized alkali metal chloride through a bed of silica at a temperature of 1000° C. to 1500° C. The present invention is based on the discovery that silicon tetrafluoride is a highly active catalyst in the oxidation of an alkali metal chloride over silica to form partially water-soluble, basic, alkali metal silicates and chlorine. In the absence of silicon tetrafluoride only a very small or no conversion to chlorine occurs. The silicon tetrafluoride remains unaffected by the reaction and can be continuously recycled. The side products formed in this reaction are the alkali metal silicates which have significant technical utility in themselves.

The process of the present invention may be suitably carried out by maintaining a bed of silica particles above a molten pool of the alkali metal chloride at temperatures of 1000° C. to 1500° C. At these temperatures considerable vaporization of the alkali metal chloride occurs. A mixture of silicon tetrafluoride and an oxygen-containing gas, such as pure oxygen or air, is then passed either through or over the molten pool of the alkali metal chloride, mixed with the vaporized alkali metal chloride and then passed as a mixture through the heated silica bed. A mixture of chlorine, unreacted oxygen and silicon tetrafluoride is formed which is then readily separated by condensation at lower temperatures. The separated silicon tetrafluoride catalyst is then recycled with additional oxidizing agent. The alkali metal silicate by-product is formed on the silica particles and, is at the upper range of the reaction temperatures, a viscous liquid which drops back into the pool of the molten alkali metal chloride where it forms a separate layer of silicate. The difference in density and the insolubility of the alkali metal chloride and the silicate in each other results in the formation of two layers and allows the easy separation of the by-product from the starting material.

The alkali metal chlorides which can be employed in the process of the present invention are principally potassium chloride, sodium chloride and lithium chloride. The preferred chloride, however, is the sodium chloride. As described hereinabove, the chloride is maintained as a molten pool at temperatures at which substantial vaporization occurs. The vaporized chloride is reacted on the surface of the silica particles. The silica employed in the process of the present invention may be pure silica or may be silica in combined form, such as is found in clays or silicate minerals. The reaction is preferably carried out in a quartz vessel. Known high temperature furnaces, such as an electric resistance furnace, may be employed. The process may be carried out on a batch scale or on a continuous scale if desired. The formation of chlorine and the water-soluble alkali metal silicates, in accordance with the present invention, is not dependent on the quantities of reactants and the ratio of the reactants to each other. However, in general, it is preferred to employ an excess of the oxidizing agent which is supplied to the reaction vessel in a continuous manner. It is, however, also possible to supply the alkali metal chloride and the silica on a continuous basis to the reaction system. The silica, furthermore, is preferably employed in small particle size since such particle size gives rise to a larger surface on which reaction can occur. The quantity of the catalyst, silicon tetrafluoride, may also be varied over wide ranges. Since the catalyst is completely recovered and can be recycled to the reaction mixture, the exact quantity of catalyst employed is of no critical importance. However, in general, the quantity of catalyst giving rise to outstanding results varies from 5 to 200% of the quantity of oxygen employed.

The process of the present invention is further demonstrated by the following examples:

Example I

Into a Lindberg furnace was placed a ceramic alumina reaction tube having a length of 18" and a diameter of 1". Into this tube was then placed 20 g. of sodium chloride; a platinum gauze was inserted and 40 g. of silicon dioxide in the form of sand having a particle size of 30 to 40 mesh was placed on top of the gauze. The reaction tube was then heated to 1100° C. and a mixture of oxygen and silicon tetrafluoride was passed into the molten sodium chloride at the rate of 19 milliliters per minute for the oxygen and 5 milliliters per minute for the silicon tetrafluoride. The reaction was continued for a period of 220 minutes. The off-gases from the reaction mixture were analyzed for chlorine by photometric methods and it was found that the off-gases contained between 0 and 48% of chlorine with an average chlorine concentration of 28%. In the absence of the silicon tetrafluoride, the chlorine concentration in the off-gases dropped to less than 1%.

Example II

Into a Lindberg furnace was placed a quartz tube having a diameter of 1.5" and a length of 18". Twenty grams of sodium chloride were placed into the tube, a platinum gauze was inserted and 10 grams of silicon dioxide comprising 14 to 20 mesh quartz was placed on top of the platinum gauze. The reaction vessel was heated to 1175° C. and oxygen at the rate of 30 milliliters per minute and silicon tetrafluoride at the rate of 30 milliliters per minute were passed into the molten pool of sodium chloride. Photometric analysis of the off-gases showed an average concentration of 10% of chlorine over a reaction period of 75 minutes. On completion of the reaction, sodium silicate was found to be present in the silica bed. The sodium silicate could be separated by treating the reaction bed with hot water. The sodium silicate obtained has a ratio of sodium oxide to silicon dioxide of 1:3 to 1:4.

The examples hereinabove have illustrated the applicability of the process of the present invention with sodium chloride. Although sodium chloride is the preferred alkali metal chloride to be employed in the process, it is to be understood that other alkali metal chlorides, such as of potassium, rubidium and cesium, may equally well be employed in this process. Various modifications of technical features of carrying out the process of the present invention will occur to those skilled in the art. The presence of silicon tetrafluoride catalyzes the reaction of silicon dioxide, alkali metal chloride and oxygen and thereby allows the reaction to proceed at lower temperatures and yet gives rise to chlorine yields which make this reaction economically attractive.

I claim:

1. A process for the preparation of chlorine which comprises contacting a mixture of vaporized alkali metal chloride and oxygen with silica at a temperature of 1000 to 1500° C. in the presence of silicon tetrafluoride and recovering chlorine from the resulting gaseous mixture.

2. The process as set forth in claim 1 wherein the alkali metal chloride is sodium chloride.

References Cited in the file of this patent

UNITED STATES PATENTS

| | | |
|---|---|---|
| 677,906 | Van Denbergh | July 9, 1901 |
| 2,823,097 | Mockrin | Feb. 11, 1958 |
| 2,829,030 | Habernickel | Apr. 1, 1958 |